(12) United States Patent
Verrilli

(10) Patent No.: US 12,163,547 B2
(45) Date of Patent: Dec. 10, 2024

(54) CERAMIC MATRIX COMPOSITE FASTENER

(71) Applicant: General Electric Company, Schenectady, NY (US)

(72) Inventor: Michael James Verrilli, Loveland, OH (US)

(73) Assignee: General Electric Company, Evendale, OH (US)

( * ) Notice: Subject to any disclaimer, the term of this patent is extended or adjusted under 35 U.S.C. 154(b) by 828 days.

(21) Appl. No.: 17/205,047

(22) Filed: Mar. 18, 2021

(65) Prior Publication Data

US 2022/0299053 A1 Sep. 22, 2022

(51) Int. Cl.
*B28B 23/02* (2006.01)
*F16B 33/00* (2006.01)

(52) U.S. Cl.
CPC ................. *F16B 33/006* (2013.01)

(58) Field of Classification Search
CPC .. B28B 19/0015; B28B 23/02; B28B 23/0006
USPC ....................................................... 264/642
See application file for complete search history.

(56) References Cited

U.S. PATENT DOCUMENTS

| | | |
|---|---|---|
| 5,127,783 A | 7/1992 | Moghe et al. |
| 5,405,227 A | 4/1995 | His et al. |
| 6,042,315 A | 3/2000 | Miller et al. |
| 6,045,310 A | 4/2000 | Miller et al. |
| 7,377,469 B2 | 5/2008 | Cherian |
| 7,799,405 B1 | 9/2010 | Vance et al. |
| 7,874,059 B2 | 1/2011 | Morrison et al. |
| 7,967,562 B2 | 6/2011 | Frost et al. |
| 10,316,695 B2 | 6/2019 | Renggli |
| 10,851,672 B2 | 12/2020 | Jakomin et al. |
| 2003/0131982 A1 | 7/2003 | Riedell |
| 2007/0280822 A1 | 12/2007 | Frost et al. |
| 2009/0226279 A1 | 9/2009 | Jarmon |
| 2010/0189529 A1 | 7/2010 | Steffier |
| 2010/0263194 A1 | 10/2010 | Morrison et al. |
| 2011/0203255 A1 | 8/2011 | Conete |
| 2015/0275680 A1 | 10/2015 | Gallet |
| 2018/0346096 A1 | 12/2018 | White |
| 2020/0392045 A1 | 12/2020 | Ortona et al. |

FOREIGN PATENT DOCUMENTS

| | | |
|---|---|---|
| CN | 106565261 A | 4/2017 |
| CN | 111333428 A | 6/2020 |
| EP | 3034891 A1 | 6/2016 |
| EP | 3244029 A1 | 11/2017 |
| JP | H04331811 A | 11/1992 |
| JP | H10231182 A | 9/1998 |
| JP | H11255567 A | 9/1999 |
| JP | 2001072475 A | 3/2001 |
| WO | WO2014/004017 A1 | 1/2014 |

*Primary Examiner* — Jeffrey M Wollschlager
*Assistant Examiner* — Xue H Liu
(74) *Attorney, Agent, or Firm* — Dority & Manning, P.A.

(57) ABSTRACT

A method of forming a ceramic matrix composite (CMC) fastener, the method comprising: shaping a preform to form a green fastener; applying one or more layers to an outer surface of the green fastener to form a layered green fastener; and finishing the layered green fastener to form the CMC fastener.

9 Claims, 4 Drawing Sheets

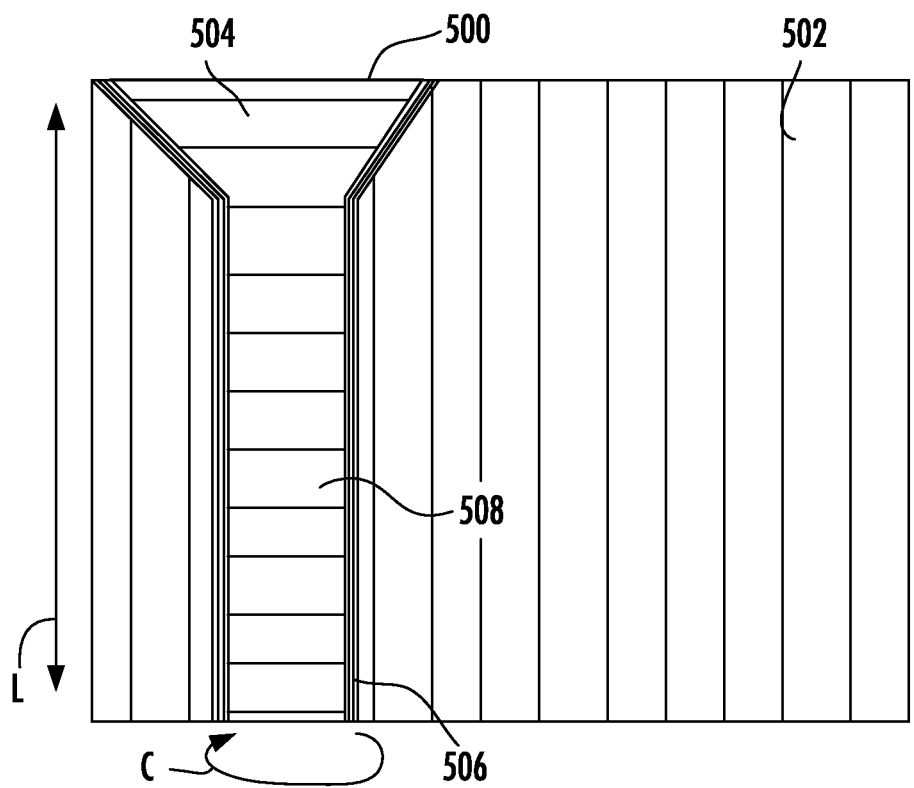
FIG. 5
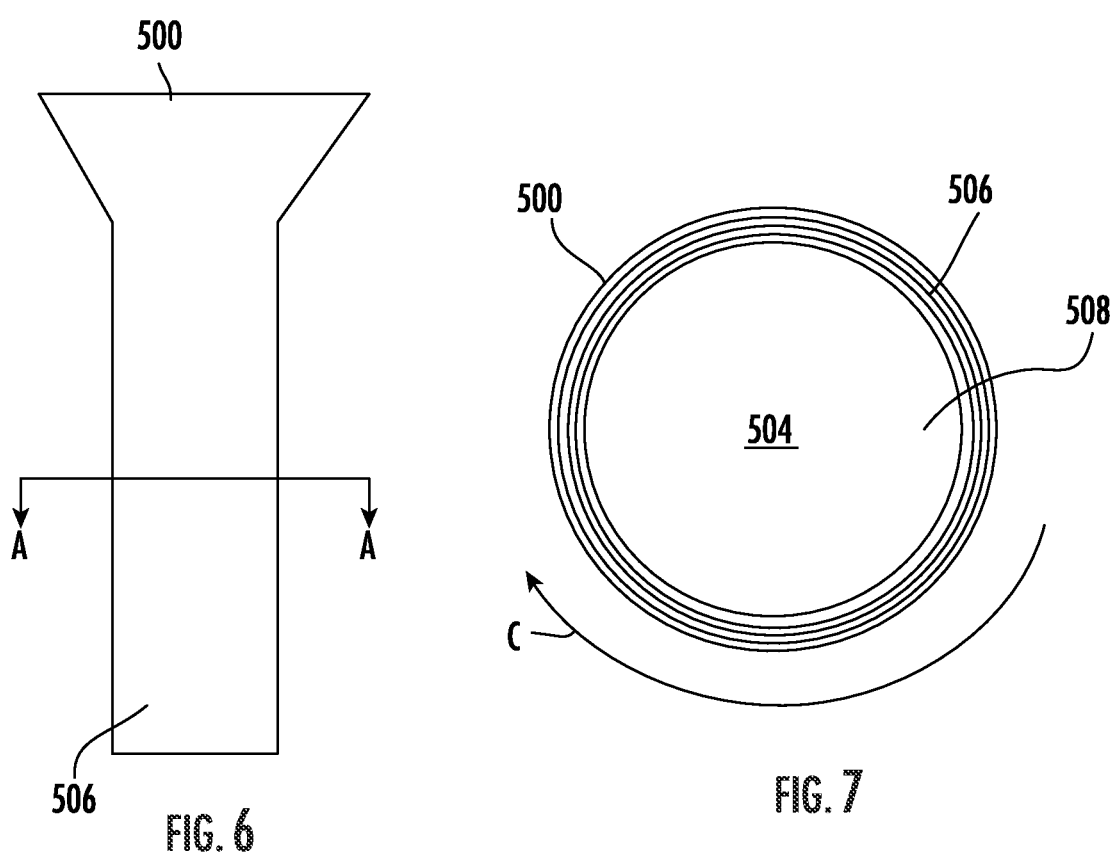
FIG. 6
FIG. 7

CERAMIC MATRIX COMPOSITE FASTENER

FIELD

The present subject matter relates generally to ceramic matrix composite (CMC) fasteners, and more particularly to CMC fasteners having improved strength.

BACKGROUND

Many components on high speed aviation equipment are formed from CMC bodies. Exemplary components include shrouds, leading edges, nozzles, and combustor liners. At supersonic, and more particularly at hypersonic speeds, these components can exceed temperatures well in excess of 1700° F., such as 4000° F. and higher.

Traditionally, these CMC components are secured together and to other components of the high speed aviation equipment through metallic hardware. However, for high speed applications (particularly at hypersonic speeds), temperatures are above safe operating conditions for metal hardware.

Accordingly, industries with components subjected to high operating temperature environments continue to demand improvements to fasteners and associated methods for attaching CMC and related components together while permitting use at high operating temperatures and extreme operating conditions.

BRIEF DESCRIPTION

Aspects and advantages of the invention will be set forth in part in the following description, or may be obvious from the description, or may be learned through practice of the invention.

In one exemplary embodiment of the present disclosure, a method of forming a ceramic matrix composite (CMC) fastener, the method comprising: shaping a preform to form a green fastener; applying one or more layers to an outer surface of the green fastener to form a layered green fastener; and finishing the layered green fastener to form the CMC fastener.

According to another exemplary embodiment, a ceramic matrix composite (CMC) fastener comprising: a body having a head and a shank coupled to the head, the body including an inner portion having a first construction and an outer portion disposed outside of the inner portion and having a second construction different than the first construction, wherein each of the inner and outer portions includes SiC/SiC, C/SiC, or oxide/oxide.

According to another exemplary embodiment, an assembly comprising: a ceramic matrix composite (CMC) structure; a secondary structure; and a CMC fastener connecting the CMC structure and secondary structure together, the CMC fastener comprising a body including an inner portion and an outer portion comprising a CMC tape extending circumferentially around the inner portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 5 is a cross-sectional view of an assembly including a CMC fastener extending through a substrate in accordance with an exemplary embodiment of the present disclosure.

FIG. 6 is an elevation view of a CMC fastener in accordance with an exemplary embodiment of the present disclosure.

FIG. 7 is a cross-sectional view of the CMC fastener of FIG. 6 as seen along Line A-A in FIG. 6 in accordance with an exemplary embodiment of the present disclosure.

Figure 1:
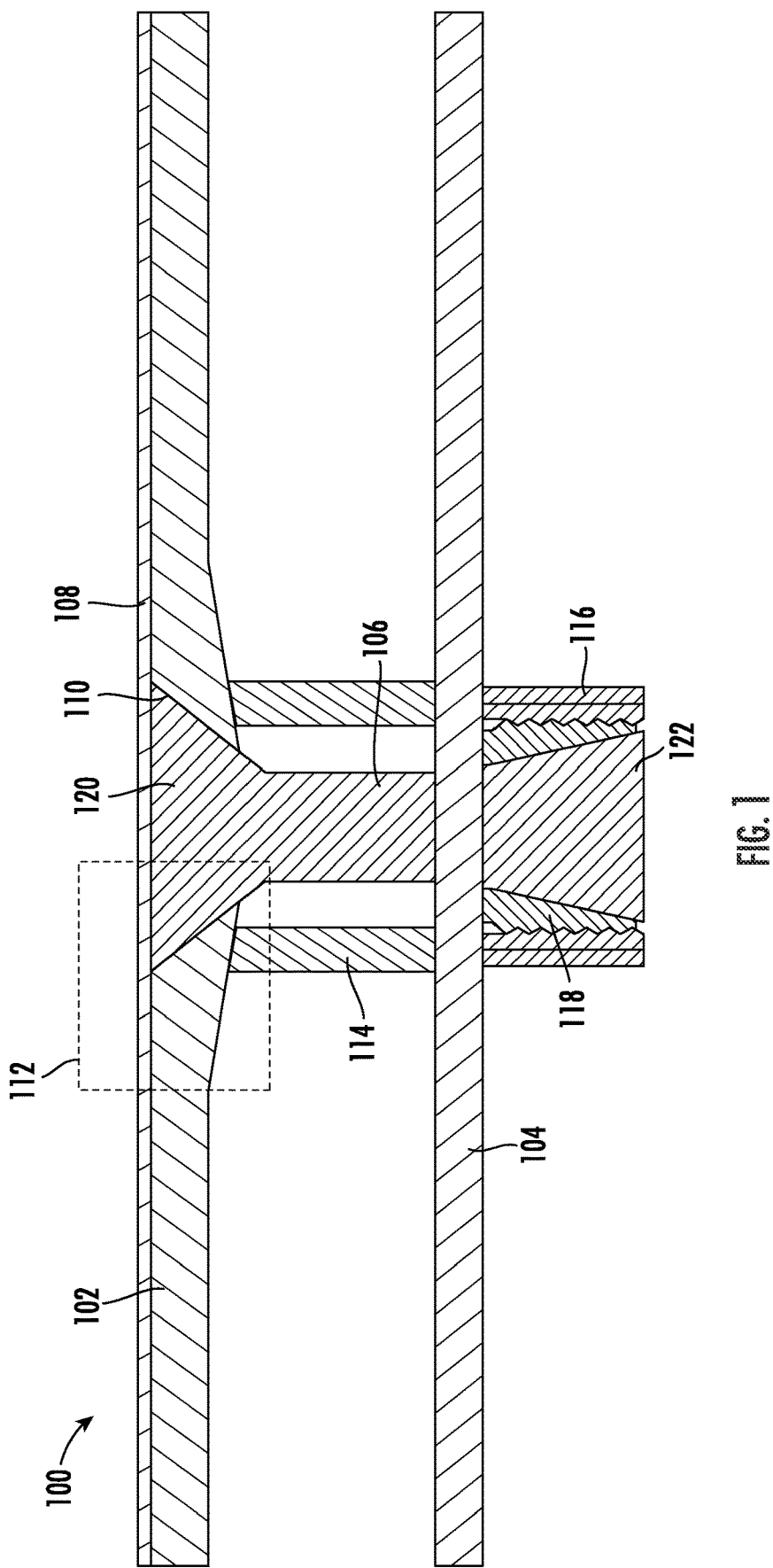
FIG. 1 is a cross-sectional view of an assembly including a CMC fastener coupling a CMC structure to a secondary structure in accordance with an exemplary embodiment of the present disclosure.

Repeat use of reference characters in the present specification and drawings is intended to represent the same or analogous features or elements of the present invention.

DETAILED DESCRIPTION

Reference now will be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In accordance with one or more embodiments described herein, a ceramic matrix composite (CMC) fastener can include an inner portion having a first construction and an outer portion disposed outside of the inner portion and having a second construction different than the first construction. In an exemplary embodiment, the inner portion can have a spiral layer construction formed of a wrapped base material. The outer portion can include one or more plies of material extending circumferentially around the inner portion. The CMC fastener can be used to connect CMC structures to secondary structures, such as other CMC structures and non-CMC structures, with improved stiffness and improved interlaminar capability.

CMC fasteners in accordance with embodiments described herein can exhibit increased strength as a result of their construction. More particularly, CMC fasteners described herein can exhibit increased interlaminar strength so as to resist breaking, e.g., delaminating, under loading conditions. In an embodiment, CMC fasteners described herein can be formed from a circumferentially arranged stratum as opposed to being machined, e.g., milled, from flat panels of multi-layered material where failure may occur as a result of delamination or cracking between plies of the multi-layered material.

Referring now to the Figures, FIG. 1 illustrates an exemplary assembly 100 in accordance with an embodiment of the present disclosure. The assembly 100 generally includes a ceramic matrix composite (CMC) structure 102 coupled to a secondary structure 104 through a CMC fastener 106.

As used herein, the term "ceramic matrix composite" or "CMC" generally refers to a non-metallic material having high temperature capability, such as composite materials including silicon carbide, silicon, silica or alumina matrix materials and combinations thereof. Typically with CMC materials, ceramic fibers are embedded within the matrix such as oxidation stable reinforcing fibers including monofilaments like sapphire and silicon carbide, as well as rovings and yarn including silicon carbide, alumina silicates, and chopped whiskers and fibers, and optionally ceramic particles (e.g., oxides of Si, Al, Zr, Y and combinations thereof) and inorganic fillers (e.g., pyrophyllite, wollastonite, mica, talc, kyanite and montmorillonite). CMC materials may have coefficients of thermal expansion in the range of about $1.3 \times 10^{-6}$ in/in/° F. to about $3.5 \times 10^{-6}$ in/in/° F. in a temperature range of approximately 1000-1200° F.

The assembly 100 may be part of a combustion portion of an aerospace engine, such as a combustion portion of a turbofan engine, a turboshaft engine, a turbojet engine, a turboprop engine, etc. The CMC structure 102 can include, for example, a liner or dome of the combustion portion. In such a manner, the structure 102 may be a CMC liner.

A coating 108 can be disposed on the CMC structure 102. By way of example, the coating 108 can be an oxidative protectant configured to prevent oxidation of the underlying CMC liner. As depicted in the illustrated embodiment, the coating 108 can cover both the CMC structure 102 and CMC fastener 106 either as a continuous coating or as separate coating portions.

The CMC structure 102 can define an opening 110 in which the CMC fastener 106 is receivable. In certain embodiments, the opening 110 can define a sloped entrance profile so as to retain a tapered end of the CMC fastener 106 (described below in greater detail). The CMC structure 102 may have a thickened region 112 to support clamping forces of the CMC fastener 106. The thickened region 112 may include a thickened area in an area of the CMC structure 102 near the opening 110. By way of non-limiting example, the thickened region 112 can define a thickness that is at least 101% of the thickness of the CMC structure 102 at areas not within the thickened region 112, such as at least 102%, such as at least 103%, such as at least 104%, such as at least 105%, such as at least 110%, such as at least 120%, such as at least 130%, such as at least 140%, such as at least 150%.

The secondary structure 104 can be spaced apart from the CMC structure 102. By way of non-limiting example, the secondary structure 104 can include a metallic structure. The metallic structure can be part of an underlying portion of an aircraft or aircraft engine. In another non-limiting example, the secondary structure 104 can include another CMC structure. In certain instances, the secondary structure 104 can generally include a support structure to which the CMC structure 102 is attachable.

A spacer 114 can be disposed between, and space apart, the CMC structure 102 and secondary structure 104. In certain instances, the spacer 114 can include a body having a hole through which the CMC fastener 106 is receivable. By way of example, the spacer 114 can include silicon carbide, such as Hexaloy SA. The height of the spacer 114 can be made so as to space the CMC structure 102 and secondary structure 104 a desired distance from one another. Instances where the CMC structure 102 and secondary structure 104 require a gap therebetween may include applications having hot flow paths and/or cooling structures flowing between the CMC structure 102 and secondary structure 104.

The CMC fastener 106 can extend through the CMC structure 102, the secondary structure 104, and optionally the spacer 114. A nut 116 can be secured to the CMC fastener 106 to maintain the assembly 100 of the CMC structure 102 and secondary structure 104 at desired positions relative to one another. In the embodiment depicted in FIG. 1, the nut 116 is engaged with the CMC fastener 106 through an intermediary collar 118. The intermediary collar 118 can include, for example, a split ring threaded sleeve configured to interface with the CMC fastener 106. The split ring threaded sleeve can include, for example, a metallic structure, a CMC structure, or the like. The CMC fastener 106 of the illustrated embodiment includes a dual tapered-head design including a first tapered head 120 configured to engage with the CMC structure 102 and a second tapered head 122 configured to engage with the secondary structure 104. More particularly, the second tapered head 122 can be engaged with the nut 116 through the intermediary collar 118 which is disposed around the second tapered head 122. In certain instances, the intermediary collar 118 can be coupled to the second tapered head 122. For example, the intermediary collar 118 can be bonded to the secondary tapered head 122. Coupling between the intermediary collar 118 and second tapered head 122 can occur, in a particular embodiment, after the CMC fastener 106 is in position relative to the secondary structure 104, e.g., the CMC fastener 106 extends through the secondary structure 104.

Figure 2:
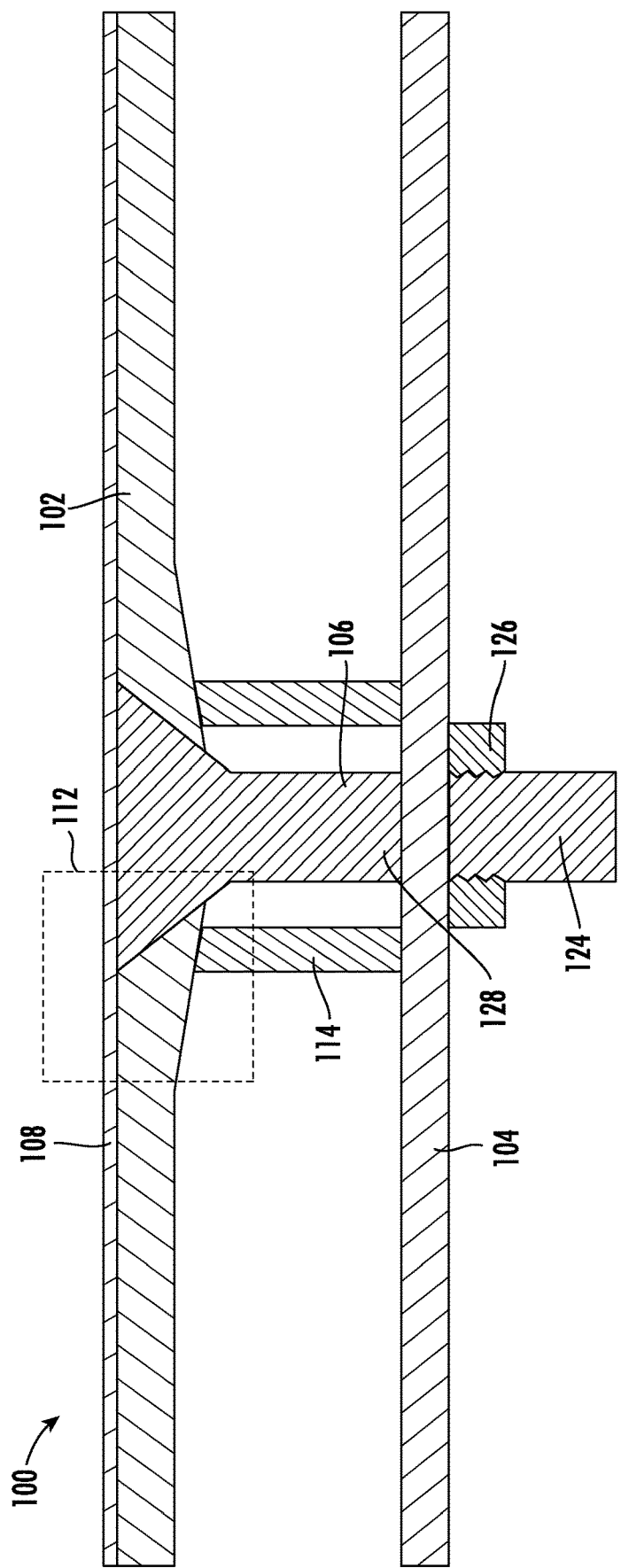
FIG. 2 is a cross-sectional view of an assembly including a CMC fastener coupling a CMC structure to a secondary structure in accordance with an exemplary embodiment of the present disclosure.

FIG. 2 illustrates the assembly 100 in accordance with another embodiment of the present disclosure. The assembly 100 includes the CMC structure 102 spaced apart from the secondary structure 104 and the CMC fastener 106 coupling the CMC structure 102 and secondary structure 104 together. The CMC structure 102 includes the coating 108 and thickened region 112. Spacer 114 is disposed between and spaces apart the CMC structure 102 and the secondary structure 104. Unlike the assembly 100 depicted in FIG. 1, the CMC fastener 106 depicted in FIG. 2 includes a threaded portion 124 including a plurality of threads. The threaded portion 124 can be integrally formed with a shank 128 of the CMC fastener 106. A nut 126 can be threadably engaged with the threaded portion 124 of the CMC fastener 106 and tightened to secure the CMC structure 102 and secondary structure 104 together. In an embodiment, the nut 126 is a CMC nut.

Figure 3:
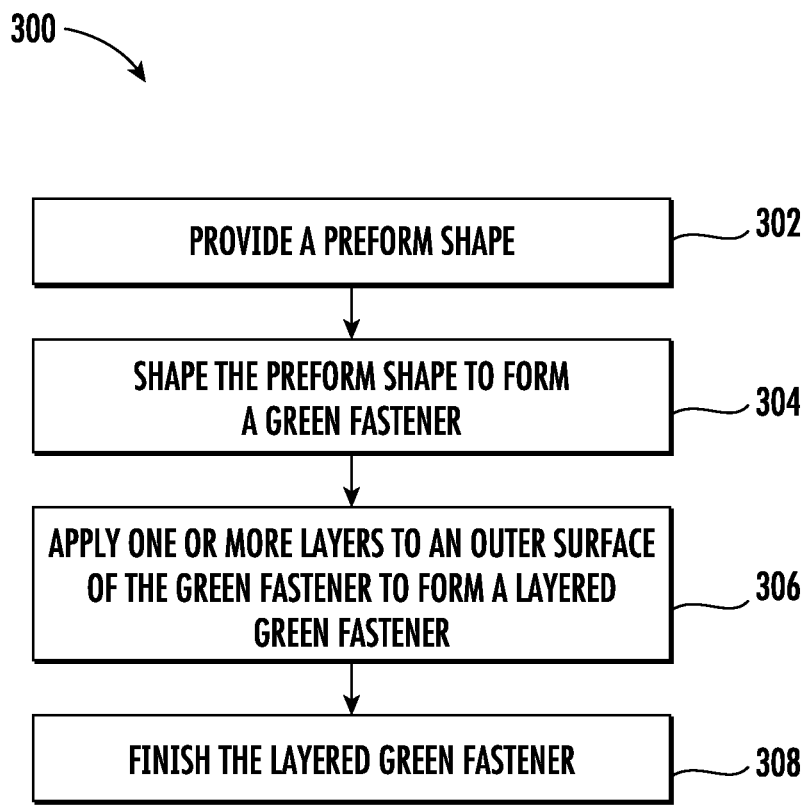
FIG. 3 is a flow chart of a method of forming a CMC fastener in accordance with an exemplary embodiment of the present disclosure.

FIG. 3 illustrates a method 300 of forming a CMC fastener. The method 300 includes a step 302 of providing a preform. The preform may have an initial shape that includes an inner portion of the CMC fastener. The preform can be loosely shaped such that the preform has a shape generally similar to the shape of the CMC fastener. In an embodiment, the preform shape can be formed by rolling a base material into a cylinder. The cylinder can include a solid cylinder or a hollow cylinder—including a hole extending down an axial length of the preform. While rolling is provided above as an exemplary process of forming the preform into the initial shape, in accordance with other embodiments, the preform can be formed into the initial shape through extrusion, machining, additive manufacture, stamping, forging, layering, and the like.

By way of non-limiting example, preforms for CMC fasteners can be formed to an initial shape from a dry tow layup. Two by two (2×2) braided twill can be used to make a tube. Twill is a type of textile with a pattern of diagonal parallel ribs. In an embodiment, the twill can include a round sleeve defining a central aperture such that the twill can be slid over a tool. The braided twill can include, for example, a +/−45° weave. In certain instances, the +/−45° weave can include a 0/90 weave rotated by 45° to permit increased pliability and easier formation of a final shape as compared to a 0/90 weave. Exemplary materials include carbon fibers, carbon fiber reinforced SiC (C/SiC), SiC fiber reinforced SiC (SiC/SiC) in, e.g., 5 harness satin and 8 harness satin. The carbon fibers can include, for example, T300 carbon fibers. The tube formed by the braided twill can have various diameters, shapes, and features as warranted by the particular shape of the desired CMC fastener. For instance, the braided twill can be used to form the tapered portions of the CMC fastener, e.g., at the head and shank of the CMC fastener. Additional fibers, such as free fibers and/or cloth, can be used as inserts to build up the tapered head and tapered shank. These fibers may be 0° fibers and/or plain weave cloth.

By way of another non-limiting example, preforms of SiC/SiC can be cut from prepreg, or non-prepreg, CMC tape. For embodiments using prepreg CMC tape, the tape can include a pre-prepared composition of fiber and reinforcement. The CMC tape can be cut to length and rolled to form the preform to the initial shape, such as at least the shape of the shank portion. Alternatively, the CMC tape can be layered and formed into the preform of the initial shape.

After completion of step 302, the method 300 can further include a step 304 of shaping the preform to form a green fastener. The shaping in step 304 shapes the preform from the initial shape to a modified or prescribed shape. In an embodiment, the shaping of the preform can be performed by a shaped tool. The shaped tool can include, for example, a die configured to impart a prescribed shape on the preform of the initial shape. In certain instances, the die can include a graphite die. Graphite dies can permit use of certain formation techniques, such as chemical vapor infiltration (CVI) whereby precursor gases flow inside the graphite die to form, e.g., SiC. The prescribed shape can be selected based on the particular assembly the fastener is being used with. Larger diameter openings may require larger CMC fasteners. Similarly, the use of bigger spacers may require longer CMC fasteners. Moreover, requirements of particular shapes of the fasteners, e.g., inclusion of a single or multi-tapered head, may require a unique die or patterned shape to complete.

In an embodiment, the step 304 of shaping the preform can involve the application of a compressive force to the preform. By way of example, compression force to shape the preform into the green fastener can include application of at least 1 pound per square inch (PSI), such as at least 2 PSI, such as at least 3 PSI, such as at least 4 PSI, such as at least 5 PSI, such as at least 10 PSI, such as at least 25 PSI, such as at least 50 PSI, such as at least 100 PSI, such as at least 250 PSI, such as at least 500 PSI, such as at least 1000 PSI.

In certain instances, an additional step of reinforcing may be done after forming the green fastener. Reinforcing may include, for example, the addition of through-thickness reinforcement elements, such as SiC/SiC pins extending through the green fastener body. By way of example, the green fastener body can be ultrasonically needled to make holes therein into which the SiC/SiC pins can be added. The reinforced green fastener can then be further operated on, e.g., autoclaved, pyrolyzed, machined, and the like.

The method 300 can further include a step 306 of applying one or more layers to an outer surface of the green fastener to form a layered green fastener. The one or more layers can include CMC material. For example, the one or more layers can include a CMC tape, e.g., a prepreg CMC tape. The one or more layers can include, for example, SiC/SiC, C/SiC, or oxide/oxide which can include any combination of crystalline solids that contain a metal cation and an oxide anion. In an embodiment, the green fastener (i.e., the inner portion of the CMC fastener) and the layered green fastener can both have outer surfaces defined by the same material. That is, the material used to form the preform at step 302 can be the same as, or similar to, the material used in the one or more layers at step 306.

In certain instances, the one or more layers applied at step 306 can be formed from a continuous CMC tape. The CMC tape can be wound around the green fastener. In an embodiment, the CMC tape can be wound circumferentially around the green fastener to create a multi-ply construction. The CMC tape can be wound in a completely overlapping configuration whereby side edges of the CMC tape are aligned between adjacent layers or a staggered configuration whereby the side edges of the CMC tape are offset from one another. Offset angles can range between 1° and 90°. In a particular, non-limiting embodiment, the CMC tape can be offset by approximately 45°. The one or more layers can include at least one layer, such as at least two layers, such as at least three layers, such as at least four layers, such as at least five layers, such as at least six layers, such as at least seven layers, such as at least eight layers, such as at least nine layers, such as at least ten layers. In an embodiment, the one or more layers can be wrapped at a same, or similar, tension as one another. That is, for example, tension along the CMC tape can be approximately equal during the entire wrapping process. In another embodiment, the tension characteristics of the CMC tape can be altered during the wrapping process.

In an embodiment, the material of the one or more layers applied at step 306 can have a multi-ply construction with adjacent layers being angularly offset form one another. That is, for instance, radially stacked layers can be angularly staggered such that the layers combine to have an increased multi-directional strength profile. By way of example, the adjacent layers can be angularly offset from one another within a range of −45° and 45°. In a more particular embodiment, the adjacent layers can be angularly offset from one another by 45° or 90°. Moreover, pairs of adjacent layers within the same stack can be angularly offset from one another by angles different than the angular offset between other pairs of adjacent layers.

The method 300 can further include a step 308 of finishing the layered green fastener to form the CMC fastener. The step 308 of finishing the layered green fastener can include, for example, compacting the layered green fastener, densifying one or both of the inner and outer portions of the layered green fastener, machining the layered green fastener, heating the layered green fastener, quenching or cooling the layered green fastener, and the like. In a particular embodiment, the layered green fastener may be exposed to heat during step 308 (e.g., baked or fired) in order to cure the layered green fastener and form the CMC fastener.

Additionally, or alternatively, step 308 may include performing a chemical vapor infiltration, polymer infiltration and pyrolysis, or melt-infiltration process. For example, in certain embodiments, it will be appreciated that the green fastener may be impregnated with a slurry composition prior to forming the preform or after formation of the preform at step 302, and similarly the layers added to the green fastener at step 306 may additionally be impregnated with a slurry composition. The green fastener may then undergo thermal processing, such as a cure or pyrolysis to yield a high char residue in the preform, and subsequent chemical processing, such as a chemical vapor infiltration or melt-infiltration process with silicon, to arrive at a component formed of a CMC material having a desired chemical composition and mechanical properties.

The aforementioned first and second tapered portions 120 and 122 can be formed as first and second engagement portions at the step 302 of providing the preform, the step 304 of shaping the preform to form the green fastener, the step 306 of applying one or more layers to the outer surface of the green fastener, the step 308 of finishing the layered green fastener, or during a combination of steps. In certain instances, at least one of the first and second engagement portions can alternatively, or additionally, include a threaded portion including a plurality of threads. The threads can be formed in the CMC fastener at the step 302 of providing the preform, the step 304 of shaping the preform to form the green fastener, the step 306 of applying one or more layers to the outer surface of the green fastener, the step 308 of finishing the layered green fastener, or during a combination of steps.

Figure 4:
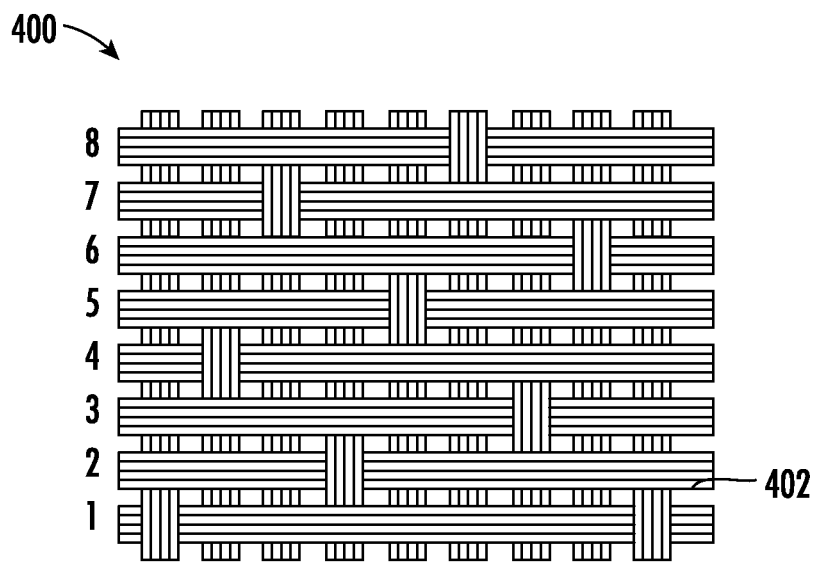
FIG. 4 is a top view of an exemplary fiber weave for the CMC fastener in accordance with an exemplary embodiment of the present disclosure.

FIG. 4 illustrates an exemplary fiber weave 400 known as an eight harness weave including a plurality of fibers 402 woven together. The nut 116, 126 can undergo loading forces which can delaminate previous fastener designs and cause failure. Use of an open weave architecture, such as that provided by the eight harness weave of FIG. 4 may be beneficial, e.g., for carbon fiber nuts. In an embodiment, dry plies of the weave 400 can be stacked together to a desirable height. Needling can be used to reinforce the weave ply stack. The dry plies can be reinforced and the nut can be shaped and machined.

In another embodiment, the nut 116, 126 can be formed from a stack of prepreg CMC tape. The stack can be cured and shaped as required. The nut 116, 126 can additionally be reinforced to prevent delamination. Reinforcing may include, for example, the addition of through-thickness reinforcement elements, such as SiC/SiC pins extending through the nut 116, 126. By way of example, the nut 116, 126 can be ultrasonically needled to make holes therein into which the SiC/SiC pins can be added. The reinforced nut 116, 126 can then be further operated on, e.g., autoclaved, machined, and the like.

FIG. 5 illustrates a cross-sectional view of an embodiment of a CMC fastener 500 disposed in a substrate 502. As illustrated, the CMC fastener 500 includes an inner section 504 and an outer section 506. The inner section 504 can correspond with an initial shape of the preform. The inner section 504 can include a stratum comprising a plurality of layers. In the illustrated embodiment, the inner section 504 includes a plurality of layers stacked in a longitudinal direction L. The outer section 506 can be applied to the inner section 504. The outer section 506 can include a single layer or a stratum comprising a plurality of layers. In an embodiment, the outer section 506 can be wrapped around the inner section 504, e.g., along the circumferential direction C. The outer section 506 can be wrapped around a circumference of the inner section 504. In the illustrated embodiment, the ply orientations of the inner and outer sections 504 and 506 are offset from one another by approximately 90 degrees. In other embodiments, the inner and outer sections 504 and 506 can be offset by a different relative angle.

FIG. 6 illustrates a side elevation view of the fastener 500 in accordance with an embodiment. While the outer section 506 is depicted, the inner section 504 can be disposed within the outer section 506. FIG. 7 illustrates a cross-sectional view of the fastener 500 as seen along Line A-A in FIG. 6. As illustrated, the outer section 506 can be wound around the inner section 504. The outer section 506 can include one continuous piece, such as illustrated, or a plurality of discrete pieces. In the illustrated embodiment, the inner section 504 is depicted as a single layer 508 of the previously described stratum. The layer 508 may lie along a plane normal to the longitudinal direction L shown in FIG. 5. In another embodiment, the layer 508 may be angularly offset from the plane normal to the longitudinal direction L. For instance, the layer 508 can be angularly offset from the plane by at least 1 degree, such as at least 2 degrees, such as at least 3 degrees, such as at least 4 degrees, such as at least 5 degrees, such as at least 10 degrees. Moreover, the layer 508 may have a variable shape, i.e., the layer 508 may lie along two or more planes or best fit-planes. In an embodiment, the inner section 504 can include a generally central opening extending along the longitudinal direction L as a result of a rolled inner section 504 formed by rolling a material of the inner section 504.

CMC fasteners in accordance with one or more embodiments described herein can exhibit improved strength at regular and/or elevated operating temperatures as compared to traditional fasteners. Inclusion of the outer portion of the CMC fastener, formed, e.g., during the step 306 of method 300, can orient fibers of the CMC fastener along the axial length of the CMC fastener body. This can increase longitudinal strength, e.g., when force is applied in a direction generally along the longitudinal axis of the CMC fastener, and prevent delamination which occurs, for example, when fasteners are formed using traditional flat-lamination techniques.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

Embodiment 1. A method of forming a ceramic matrix composite (CMC) fastener, the method comprising: shaping a preform to form a green fastener; applying one or more layers to an outer surface of the green fastener to form a layered green fastener; and finishing the layered green fastener to form the CMC fastener.

Embodiment 2. The method of any one or more of the embodiments, further comprising rolling a base material to form the preform.

Embodiment 3. The method of any one or more of the embodiments, wherein the one or more layers and base material comprise a same material.

Embodiment 4. The method of any one or more of the embodiments, wherein the base material comprises a prepreg CMC tape.

Embodiment 5. The method of any one or more of the embodiments, wherein the preform comprises SiC/SiC, C/SiC, or oxide/oxide.

Embodiment 6. The method of any one or more of the embodiments, wherein shaping the preform is performed by compressing the preform with a shaped tool.

Embodiment 7. The method of any one or more of the embodiments, wherein applying the one or more layers to the outer surface of the green fastener comprises wrapping one or more plies to the outer surface of the green fastener.

Embodiment 8. The method of any one or more of the embodiments, wherein wrapping is performed by reorienting adjacent layers of the one or more plies by an interlayer angular offset in a range of 45° and 90°.

Embodiment 9. The method of any one or more of the embodiments, wherein finishing the layered green fastener comprises compacting the layered green fastener.

Embodiment 10. The method of any one or more of the embodiments, further comprising: forming a first engagement portion at a first end of the green fastener; and forming a second engagement portion at a second end of the green fastener, each of the first and second engagement portions being selected from a tapered portion and a threaded portion.

Embodiment 11. A ceramic matrix composite (CMC) fastener comprising: a body having a head and a shank coupled to the head, the body including an inner portion having a first construction and an outer portion disposed outside of the inner portion and having a second construction different than the first construction, wherein each of the inner and outer portions includes SiC/SiC, C/SiC, or oxide/oxide.

Embodiment 12. The CMC fastener of claim 11, wherein the second construction comprises one or more plies of material extending claim 11 circumferentially around the inner portion.

Embodiment 13. The CMC fastener of any one or more of the embodiments, wherein the first construction comprises a spiral layer construction.

Embodiment 14. The CMC fastener of any one or more of the embodiments, wherein the head comprises a tapered portion of the body, and wherein the shank comprises at least one of a tapered portion and threads.

Embodiment 15. The CMC fastener of any one or more of the embodiments, wherein the inner portion comprises a base material having a rolled shape, wherein the rolled base material comprises adjacent layers offset from one another by an interlayer angular offset in a range of 45° and 90°.

Embodiment 16. The CMC fastener of any one or more of the embodiments, wherein the shank includes a threaded portion and the CMC fastener includes a CMC nut for threadably engaging the threaded portion.

Embodiment 17. An assembly comprising: a ceramic matrix composite (CMC) structure; a secondary structure; and a CMC fastener connecting the CMC structure and secondary structure together, the CMC fastener comprising a body including an inner portion and an outer portion comprising a CMC tape extending circumferentially around the inner portion.

Embodiment 18. The assembly of any one or more of the embodiments, wherein the inner and outer portions include a same material as one another, and wherein the same material includes SiC/SiC, C/SiC, or oxide/oxide.

Embodiment 19. The assembly of any one or more of the embodiments, wherein a coefficient of thermal expansion (CTE) of the CMC structure is generally the same as the CTE of the CMC fastener.

Embodiment 20. The assembly of any one or more of the embodiments, wherein the inner portion comprises a spiral layer construction.

What is claimed is:

1. A method of forming a ceramic matrix composite (CMC) fastener, the method comprising:
   rolling a base material to form a preform;
   shaping the preform to form a green fastener;
   applying one or more layers to an outer surface of the green fastener to form a layered green fastener, wherein the layered green fastener includes a body including a rolled inner section and an outer section, the rolled inner section including a central opening extending along a longitudinal direction and the outer section including the one or more layers; and
   finishing the layered green fastener to form the CMC fastener.

2. The method of claim 1, wherein the one or more layers and the base material comprise a same material.

3. The method of claim 1, wherein the base material comprises a prepreg CMC tape, and the method further comprises rolling the prepreg CMC tape to form the preform.

4. The method of claim 1, wherein the preform comprises SiC/SiC, C/SiC, or oxide/oxide.

5. The method of claim 1, wherein shaping the preform is performed by compressing the preform with a shaped tool.

6. The method of claim 1, wherein applying the one or more layers to the outer surface of the green fastener comprises wrapping one or more plies to the outer surface of the green fastener.

7. The method of claim 6, wherein wrapping is performed by reorienting adjacent layers of the one or more plies by an interlayer angular offset in a range of 45° and 90°.

8. The method of claim 1, wherein finishing the layered green fastener comprises compacting the layered green fastener.

9. The method of claim 1, further comprising:
- forming a first engagement portion at a first end of the green fastener; and
- forming a second engagement portion at a second end of the green fastener, each of the first and second engagement portions being selected from a tapered portion and a threaded portion.

* * * * *